US012791122B2

(12) United States Patent
Trout

(10) Patent No.: US 12,791,122 B2
(45) Date of Patent: Nov. 10, 2026

(54) BURIED P-TRAP AND PIPE LIFTING DEVICE AND METHOD

(71) Applicant: The Trout Group, Inc., Geneva, IL (US)

(72) Inventor: Steven M. Trout, Geneva, IL (US)

(73) Assignee: The Trout Group, Inc., Geneva, IL (US)

( * ) Notice: Subject to any disclaimer, the term of this patent is extended or adjusted under 35 U.S.C. 154(b) by 48 days.

(21) Appl. No.: 18/906,849

(22) Filed: Oct. 4, 2024

(65) Prior Publication Data

US 2026/0098596 A1 Apr. 9, 2026

(51) Int. Cl.
*F16L 1/032* (2006.01)
*B66F 1/00* (2006.01)
*F16L 1/06* (2006.01)

(52) U.S. Cl.
CPC ................ *F16L 1/032* (2013.01); *B66F 1/00* (2013.01); *F16L 1/06* (2013.01)

(58) Field of Classification Search
CPC ................ F16L 1/032; F16L 1/06; B66F 1/00
See application file for complete search history.

(56) References Cited

U.S. PATENT DOCUMENTS 2,675,132 A * 4/1954 Susil ........................ B66F 15/00 248/408
4,567,708 A * 2/1986 Haekkinen .............. E02D 35/00 404/78
10,408,375 B2 9/2019 Trout et al.
10,520,111 B2 * 12/2019 Taylor ...................... F16L 55/18
11,473,713 B2 * 10/2022 Wang .................. F16L 55/1654
2006/0275087 A1 12/2006 Trout
2019/0162353 A1 5/2019 Trout et al.
2023/0272589 A1 8/2023 Trout

FOREIGN PATENT DOCUMENTS

CN 108239972 A 7/2018
JP 06-249368 A 9/1994

OTHER PUBLICATIONS

Notification of Transmittal of the International Search Report and the Written Opinion of the International Searching Authority, or the Declaration dated Aug. 13, 2025 for International Application No. PCT/US2025/026660 (11 pages).

* cited by examiner

*Primary Examiner* — Kyle Armstrong
(74) *Attorney, Agent, or Firm* — TAYLOR & EDELSTEIN, PC

(57) ABSTRACT

An underground pipe in-situ relocation mechanism including a casement pipe, a lifting member and a lifting member moving device. The casement pipe, having upper and lower ends, is insertable into the soil of the ground alongside of the underground pipe. The lifting member being insertable into the casement pipe, the lifting member having a lifting arm pivotally coupled to an end of the lifting member. The lifting member moving device positioned on the upper end of the casement pipe and coupled to an end of the lifting member opposite the lifting arm. The lifting member moving device being configured to move the lifting member relative to the casement pipe to secure the lifting arm against a bottom of the casement pipe after the lifting arm is extended beyond the lower end of the casement pipe and the lifting arm has pivoted from an aligned position in the casement pipe.

20 Claims, 10 Drawing Sheets

BURIED P-TRAP AND PIPE LIFTING DEVICE AND METHOD

BACKGROUND OF THE INVENTION

1. Field of the Invention

The present invention relates generally to the repair of underground utilities, and more particularly to equipment that is used to modify the positioning of underground pipe.

2. Description of the Related Art

It is generally known that sewer lines should be constructed with a minimum fall of ¼ inch per 1 foot of pipe. This allows wastewater to continue flowing via gravity through the pipe while minimizing any deposit of debris. When pipes have sags, or low spots in the pipe, also known as "belly", that don't meet this minimum fall, debris can settle into the low spots. Sags are typically a problem when they are severe enough to cause debris to settle in the pipe, in the form of sediment build up. The sag or belly is where the sewer pipe has lost a continuous slope on its way to its destination, and where the rate at which liquids travel through it is significantly reduced. The reduced velocity of liquids allows the belly area to collect solids, eventually obstructing the line, resulting in sewer backups.

Additionally, the Clean Water Act has mandated that ground water infiltration into our sewer systems be substantially reduced or eliminated. Many methods of repair of pipelines have been devised. Some of those repair methods include slip lining, pipe bursting, cured in place pipe lining (CIPP), fold and form thermoplastic lining, spot repairs, as well as the conventional dig and removal/replacement of pipelines.

The "in-situ lining" repair of pipes has often been the most effective alternative to pipe "dig and replacement". However, in-situ lining cannot be performed in pipe spans where pipe joints are offset more than approximately 30%. An annular space or void adjacent to the outside surface of the pipe can be injected with a gelatinous grout material to eliminate water infiltration into the pipe. This repair is only temporary since the gelatinous material is not dimensionally stabile and often requires later replacement. The grout material is not capable of stabilizing the ground around the pipe even if the entire annular space is filled with the gelatinous grout. The lack of stability and support can result in additional stress on the pipe structure, with eventual degradation of the pipe and resulting water infiltration. This sort of in-situ repair deals with leaks, but fails to address dips or sags in the pipeline.

Injection of expanding closed cell foams and cementitious grout has been used to level or reinforce pipe sections; however, there can be a migration of the foam or grout into the pipe joint that, if left in place, can cause an occlusion or blockage. When this migration into the interior diameter of the pipe does occur, a cutting or grinding device must be inserted as a subsequent step to remove the excess foam or grout.

Remedial repairs of infrastructures that have experienced differential settlement supported on soils often rely on soil densification, helical piers, and brackets in conjunction with excavation to support below grade utilities. However, these devices cannot lift a utility to an original elevation but rather immobilize the utility from further settlement. Often, these piers and brackets are installed in conjunction with newly installed utilities in weak soil environments to minimize the likelihood of future settlement.

Presently, other than the Inventor's devices/methods, there is no known mechanical device for the raising of below grade utilities which can be operated for the use of utility raising without excavation. Presently, one known non-mechanical methodology/process for raising below grade utilities is compaction grouting. Currently, the process for raising below grade utilities without excavation has been through the use of compaction grouting utilizing either cementitious grout or an expanding polyurethane foam. Cementitious grouting is primarily limited to exterior uses due to the nature of the work. Polyurethane grouting is considerably cleaner and a more expeditious process. However, with both techniques the amount of achievable lift is dependent upon soil type, age of the pipeline, the amount of settlement and the expertise of the personnel. These techniques have the potential for the infiltration of the grout material, which can degrade the effectiveness of the intended repair.

As mentioned above, in-situ lining cannot be performed in pipe spans where pipe joints are offset more than approximately 30%, which is one reason why the invention described herein is needed to allow in-situ lining to be accomplished when previously it was not practical.

What is needed in the art is an in-situ method of removing pipe sags and stabilize the position of the pipes, without the drawbacks discussed above, to enable utility lines to be raised with precision regardless of the soil type.

SUMMARY OF THE INVENTION

The present invention provides an underground pipe lifting device and method.

The invention in one form is directed to a method for the simultaneous lifting of an underground pipe and of a surface member including the steps of cutting, inserting, positioning, raising, clamping, and causing. The cutting step includes the cutting of a hole through the surface member. The inserting step includes the inserting of at least one lifting member through the hole in the surface member and into the ground beneath the surface member, the lifting member being positioned alongside the underground pipe in the ground. The positioning step includes the positioning of a lifting arm coupled to the lifting member beneath a portion of the underground pipe. The raising step including the raising of the lifting member until the lifting arm contacts the underground pipe. The clamping step including the clamping of the lifting member to secure the lifting member to the surface member. The causing step including the causing of the surface member to rise relative to the ground thereby causing the underground pipe to move in coordination with the surface member.

The invention in another form is directed to an underground pipe in-situ relocation mechanism including a casement pipe, a lifting member and a lifting member moving device. The casement pipe, having upper and lower ends, is insertable into the soil of the ground alongside of the underground pipe. The lifting member being insertable into the casement pipe, the lifting member having a lifting arm pivotally coupled to an end of the lifting member. The lifting member moving device positioned on the upper end of the casement pipe and coupled to an end of the lifting member opposite the lifting arm. The lifting member moving device being configured to move the lifting member relative to the casement pipe to secure the lifting arm against a bottom of the casement pipe after the lifting arm is extended beyond the lower end of the casement pipe and the lifting arm has pivoted from an aligned position in the casement pipe.

An advantage of the present invention is that an underground pipe/P-Trap can be lifted along with a surface member.

Another advantage is that the present invention allows for a precise movement of an underground pipe.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
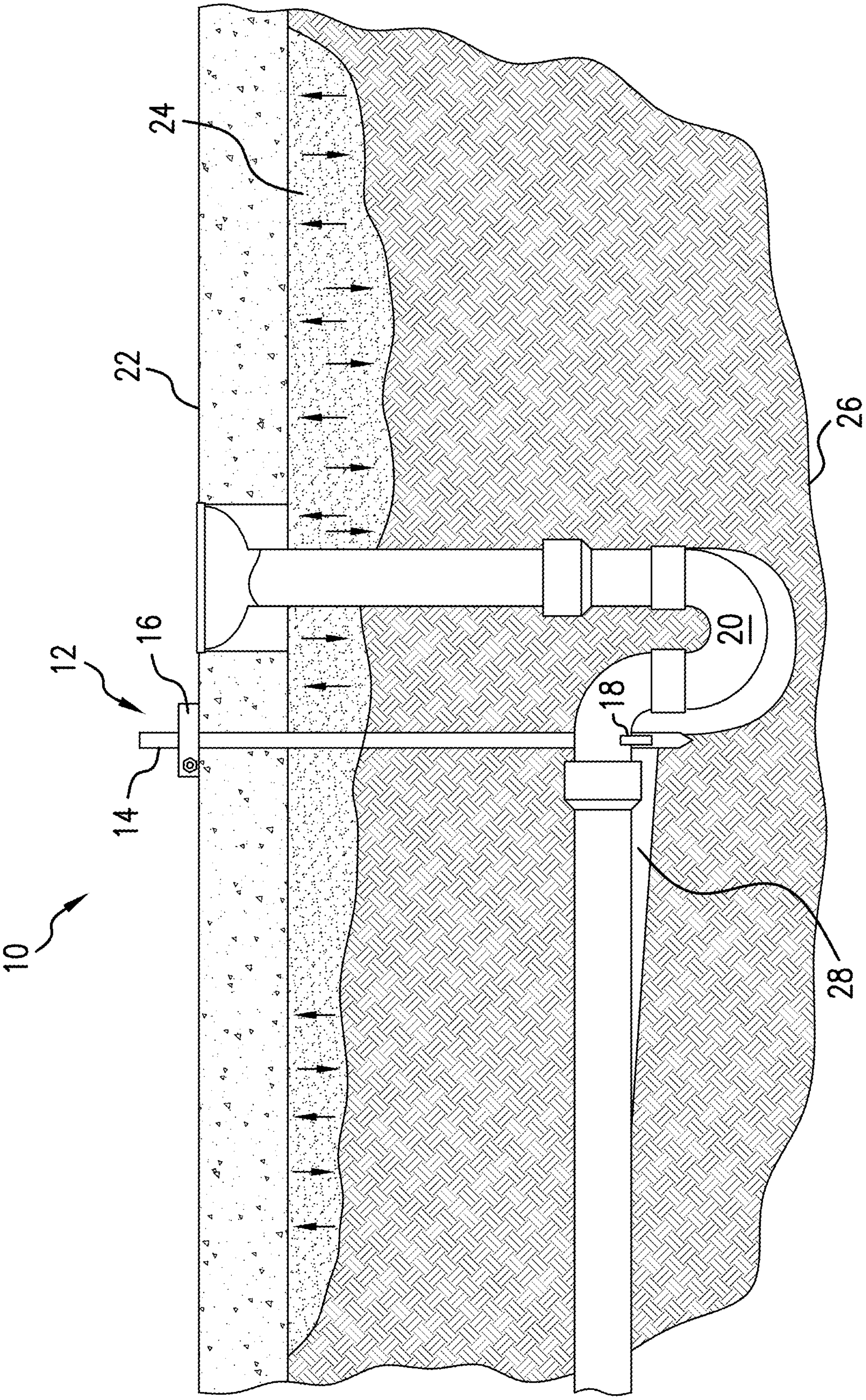
FIG. 1 is a side view of an embodiment of a pipe and P-Trap lifting device of the present invention positioned to lift the pipe and P-Trap in the schematically illustrated soil.

Referring now to the drawings, and more particularly to FIG. 1, there is shown a pipe relocation system 10 for the in-situ relocation of a buried pipe P and P-Trap 20. System 10 includes a lifting member system 12 having a lifting member 14, a clamp 16, and a lifting arm 18. P-Trap 20 is shown lifted by pipe relocation system 10, by using lifting system 12 to secure P-Trap 20 at a fixed distance, so that when surface member 22, is moved upward by the insertion of grout 24 that exerts upward pressure on surface member 22 that P-Trap 20 and the pipe coupled thereto upward in soil 26. As the underground pipe and P-Trap 20 are pulled upward due to the insertion of grout 24, which may be an expanding foam 24, a void 28 is formed, which can be filled by another application of grout to thereby stabilize the new position of P-Trap 20 and the pipe to the left in FIG. 1. The use of pipe relocation system 10 advantageously keeps P-Trap 20 from separating from the vertical pipe and/or the drain located in surface member 22, which is concrete in this example.

Pipe relocation system 10 can be used to carry out a method for the simultaneous lifting of an underground pipe 20 and of a surface member 22. The method includes the steps of cutting, inserting, positioning, raising, clamping, and causing. The cutting step includes cutting a hole through surface member 20 through which lifting member 14 is inserted. The inserting step is the inserting of at least one lifting member 14 through the hole in surface member 22 and into ground 26 beneath surface member 22, with the lifting member 14 being positioned alongside underground pipe 20 in ground 26. The positioning step includes the step of positioning lifting arm 18 that is coupled to lifting member 14 beneath a portion of underground pipe 20. The raising step includes the raising of lifting member 14 until lifting arm 18 contacts underground pipe 20. The clamping step includes the clamping of lifting member 14, by way of clamp 16 to secure lifting member 14 to surface member 22. The causing step including the causing of surface member 22 to rise relative to ground 26 thereby causing underground pipe 20 to move in coordination with surface member 22.

The causing step includes a step of inserting material beneath surface member 22 and generally above ground 26 thereby moving surface member 22 relative to ground 26. Underground pipe 20 includes a P-Trap 20, with at least one lifting member 14 being positioned proximate to P-Trap 20.

Figure 2:
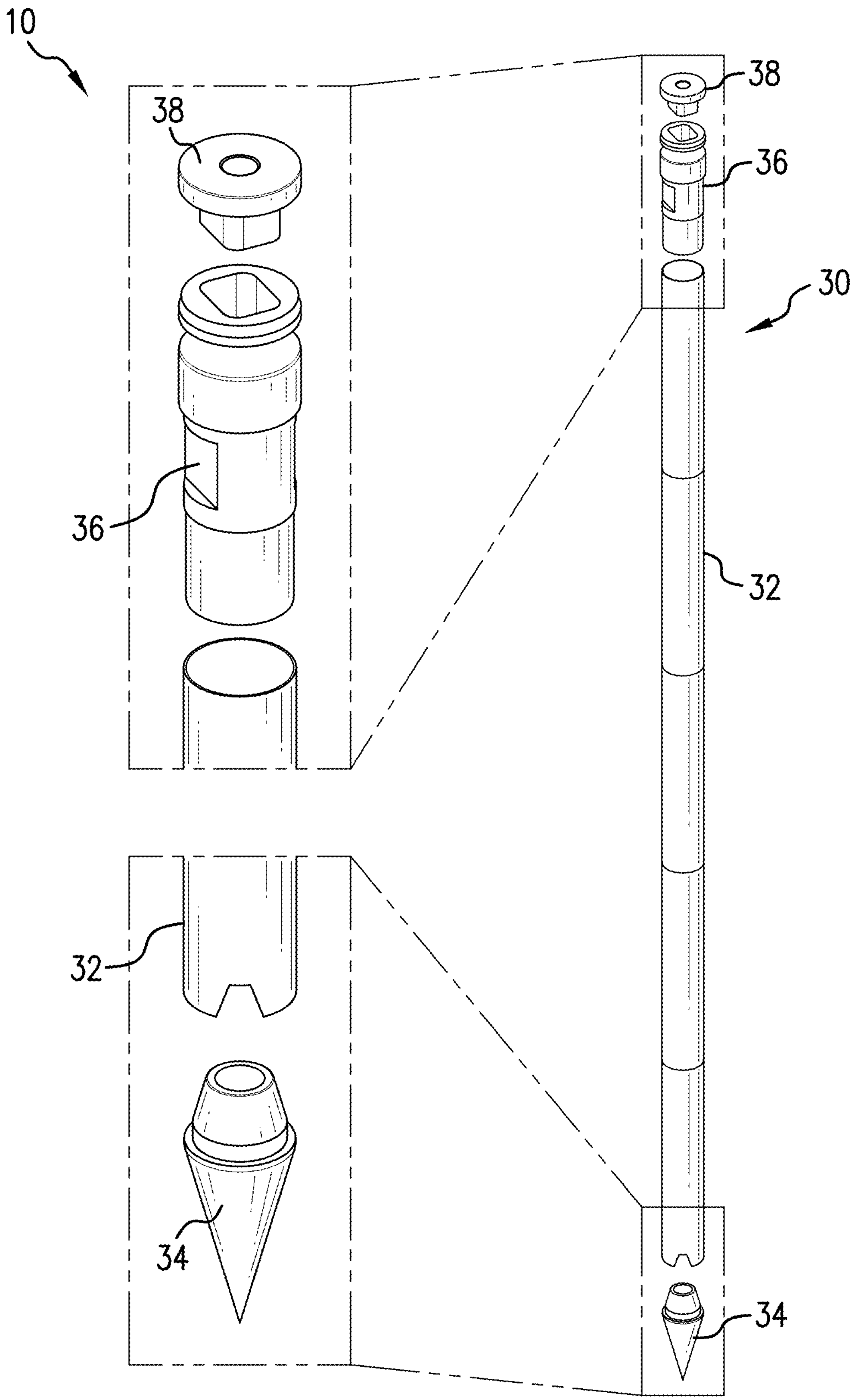
FIG. 2 is a side view of part of the lifting system of FIG. 1 of the present invention in the form of a casement pipe that has enlarged details.

Now, additionally referring to FIG. 2, there is shown another embodiment of pipe relocation system 10 including pipe lifting system 30, having a casement pipe 32, a sacrificial drive tip 34, a fitting member 36, and a fitting member 38. Sacrificial drive tip 34 is fitted into a lower end of casement pipe 32 so that system 30 can be driven into ground 26. Fitting member 36 is coupled to an upper end of casement pipe 32. Fitting member 36 has an upper opening to accommodate the insertion of lifting member 14. Fitting member 38 is shaped to accommodate the upper opening of fitting member 36 and fitting member 38 has a smaller opening to accommodate the shaft of lifting member 14 that extends therethrough and will allow movement of the shaft up and down as needed.

Figure 3:
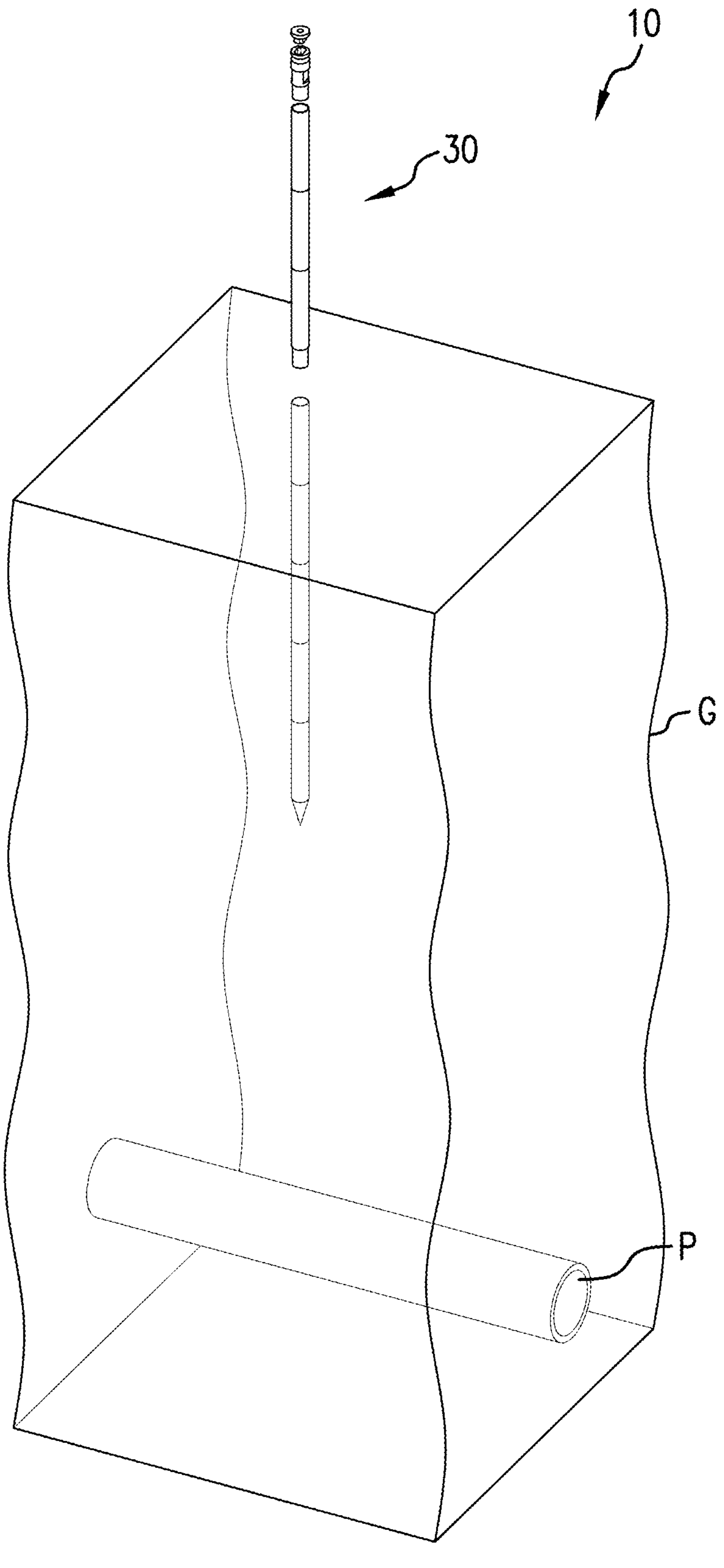
FIG. 3 is a perspective view looking through the soil to see the casement pipe of FIG. 2 as it is driven into the soil to be positioned next to an underground pipe.
Figure 4:
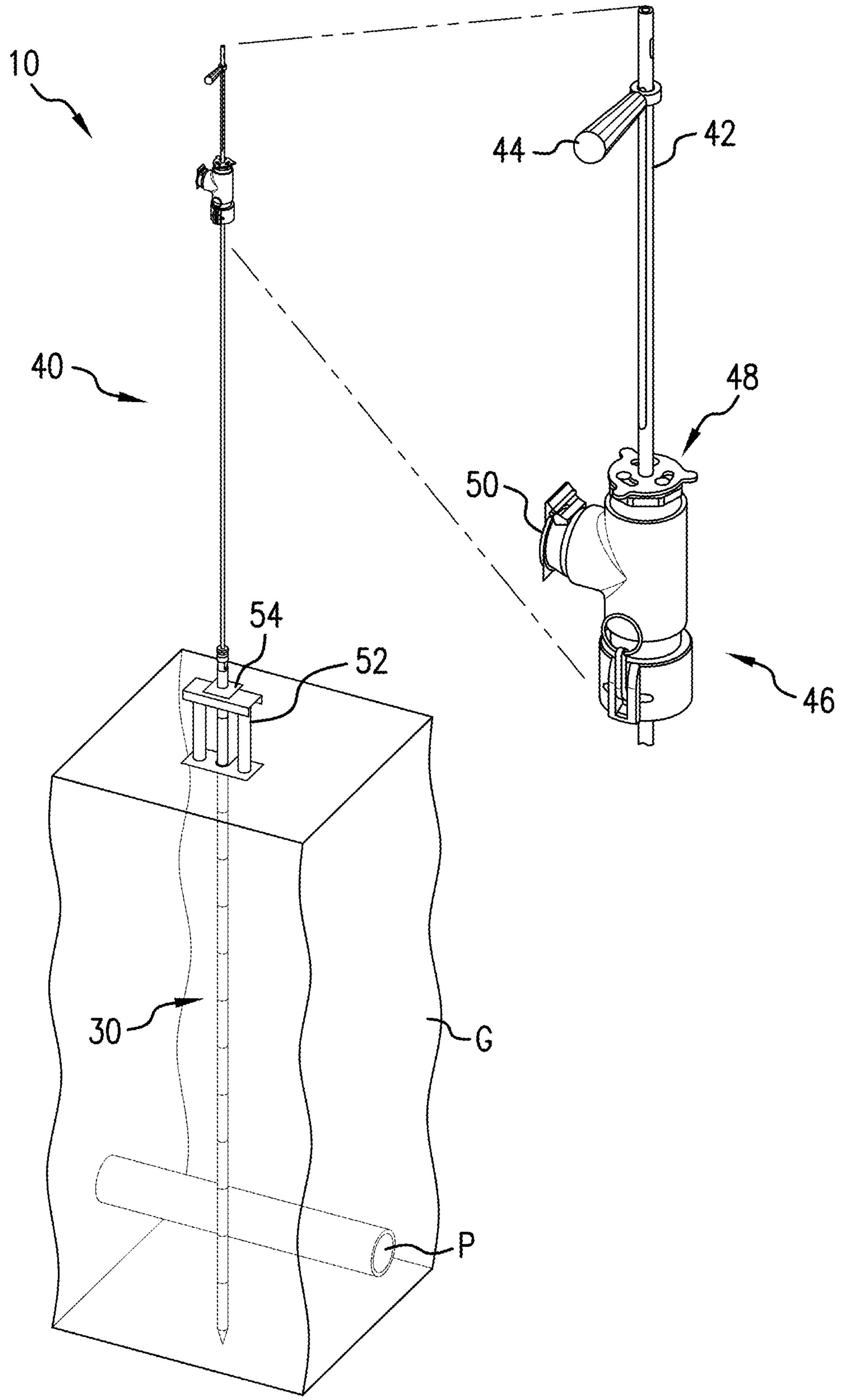
FIG. 4 is another perspective view of the casement pipe of FIGS. 2 and 3, showing a lifting mechanism, and an enhanced view of a soil extraction head of the present invention.
Figure 5:
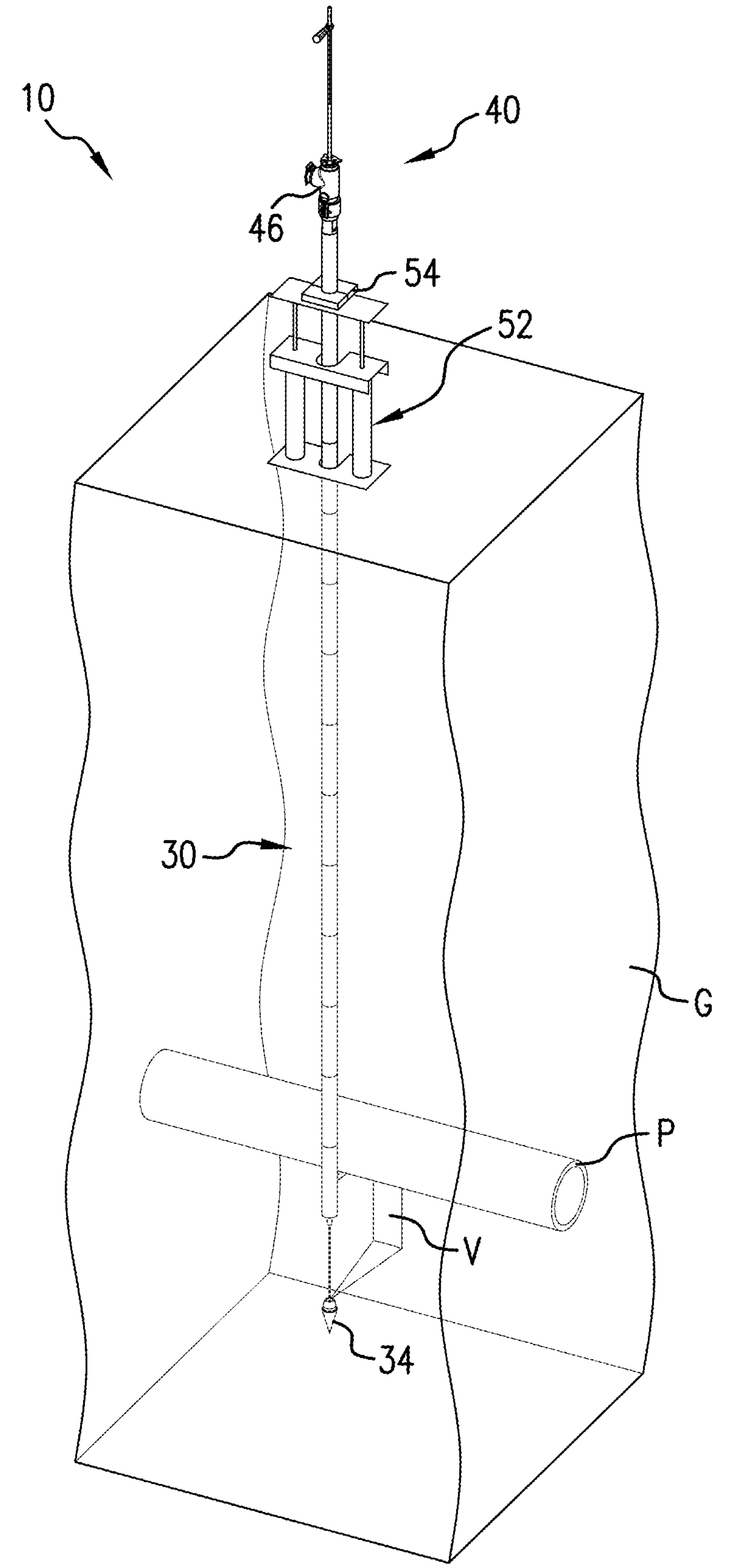
FIG. 5 is another perspective view of the lifting member system of FIGS. 1-4, showing a void created by the soil extraction device.

Now, additionally referring to FIGS. 3 and 4 there is shown pipe lifting system 30 being driven into ground G so as to align proximate to a side of pipe P. a soil extraction system 40 is inserted into pipe lifting system 30 with fitting member 38 having been removed from casement pipe 32. Soil extraction system 40 includes a water jetting device 42, an orientation handle 44, and a soil extraction hood 46 having an air portal 48 and a vacuum fitting 50. A lifting device 52 is shown coupled to casement pipe 32 of pipe lifting system 30. Atop lifting device 52 is an indexed clamp 54 that couples casement pipe 54 to lifting device 52 and provides orientation information to the user of soil extraction system 40. Soil extraction hood 46, may also be referred to as a vacuum adapter 46 in that its fluidic coupling to casement pipe 32 and to a vacuum system, not illustrated, allows for spoils removal from casement pipe 32 as water jetting device 42 delivers pressurized water from an end extending from the lower end of casement pipe 32. This is accomplished by raising casement pipe 32 away from sacrificial driving tip 34 using lifting device 52, positioning soil extraction hood 46 to an upper portion of casement pipe 32, and inserting water jetting device 42 through a port in soil extraction hood 46. Water jetting device 42 extends from the lower portion of casement pipe 32 and pressurized water is delivered to the soil beneath and in an oriented direction from the lower end of casement pipe 32. The spoils created by the addition of water to soil G causes an increase in pressure moving the spoils into casement pipe 32 and the vacuum applied to vacuum fitting or port 50 draws the spoils up casement pipe 32 and are expelled from systems 30 and 40. This action creates a void V as illustrated in FIG. 5. Orientation handle 44 is used to move water jetting device 42 up and down and rotates water jetting device 42. A vertical indicator mark along water jetting device 42, which can be a colored mark, or a feature along the shaft, identifies the orientation of the end of water jetting device 42 that extends from the lower end of casement pipe 32. Indexing clamp 54 assists the operator in knowing the angular orientation of water jetting device 42. Further, horizontal markings along the shaft of water jetting device 42 indicate the depth of water jetting device 42. Still further markings along the length of casement pipe 32 indicate the depth of casement pipe 32 so that the operator knows the depth of casement pipe 32 and hence the amount of the extension of water jetting device 42 from the lower end of casement pipe 32.

Once the desired void V is created, as shown in FIG. 5, then water jetting device 42 is withdrawn from casement pipe 32. Then soil extraction hood 46 is removed from fitting member 36 and pipe lifting member 14 is prepared for insertion into casement pipe 32.

Figure 6:
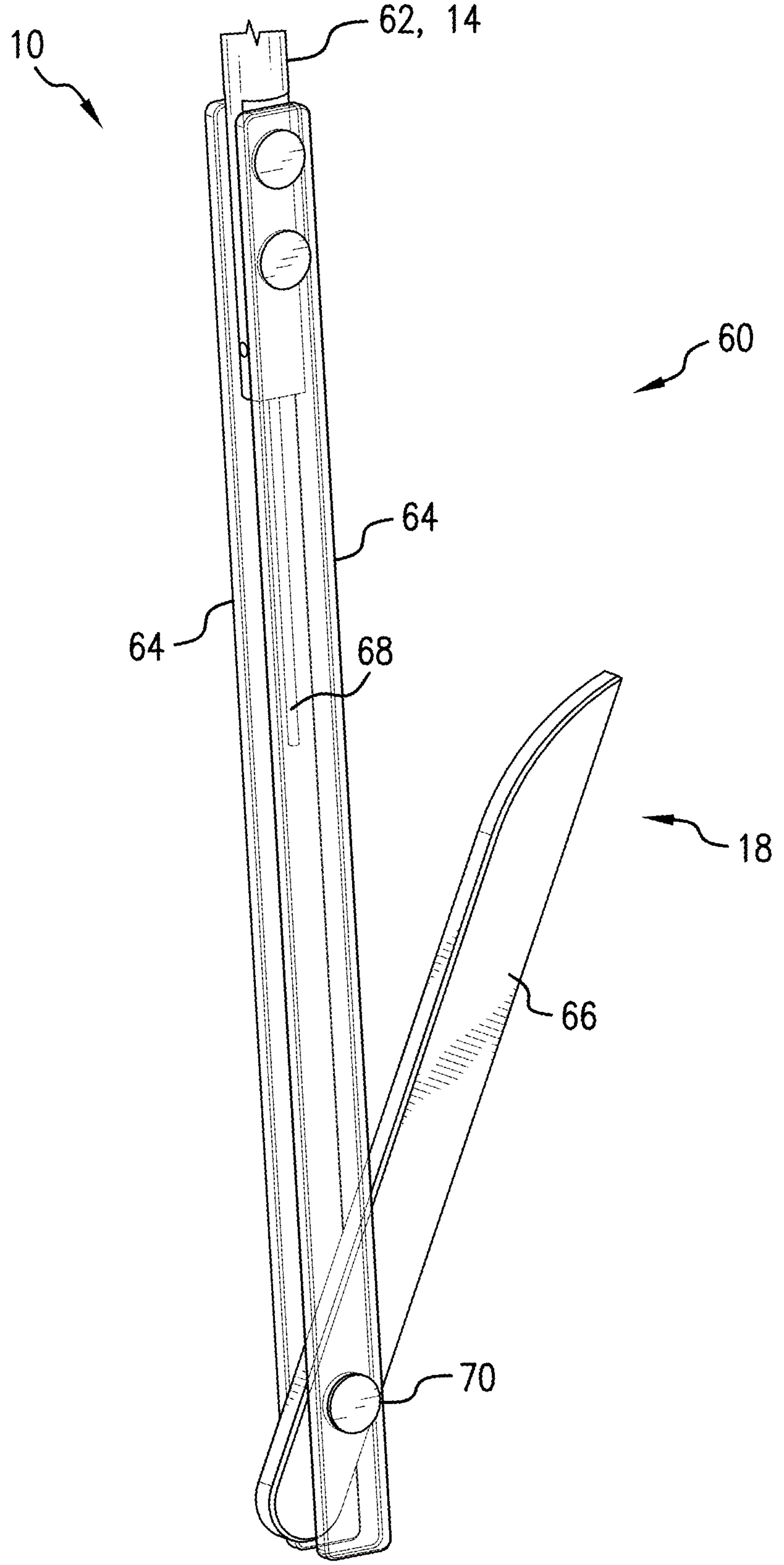
FIG. 6 is a perspective view of a lifting arm of the lifting member system of FIGS. 1-5.
Figure 7:
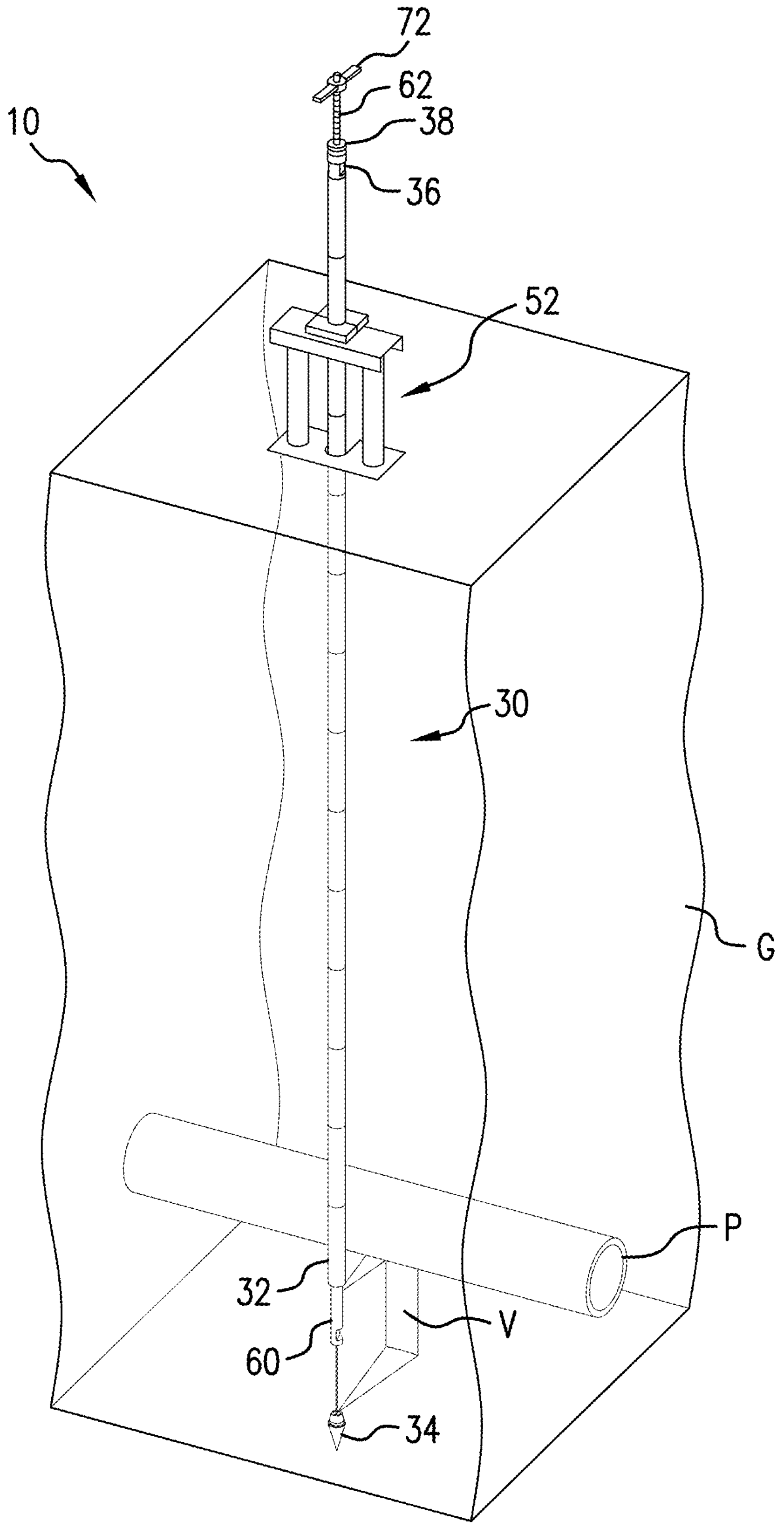
FIG. 7 is a perspective view of the lifting member being inserted into the casement pipe of the lifting member system of the previous Figs, the present invention.

Now, additionally referring to FIG. 6 are some additional details of an end of lifting member 14 having an arm mechanism 60 with a shaft 62, two side supports 64, a lifting arm 66, 18, a biasing member 68 and a pivot fastener 70. Shaft 62 has been previously discussed as a part of lifting member 14, at the upper end. Here at the lower end shaft 62 is connected to side supports 64 between which lifting arm 66 is pivotally housed during the insertion of lifting member 14 into casement pipe 32. Lifting arm 66, 18 is pivotally connected to a lower end of side supports 64 by way of fastener 70. Biasing member 68, in the form of a spring 68 is moved to the side when lifting arm 66, 18 is pushed into the space between side supports 64, thus biasing lifting arm 66 outwardly. When lifting arm 66 is lowered in casement pipe 32 to a position below the lower end of casement pipe 32, as shown in FIG. 7, biasing member 68 causes lifting arm 66 to extend outwardly sufficient for the end of the curved section to engage a lower edge of casement pipe 32. This positioning of lifting arm 66 advantageously will cause lifting arm 66 to extend outwardly as shaft 62 of lifting member 14 is raised in casement pipe 32.

Figure 8C:
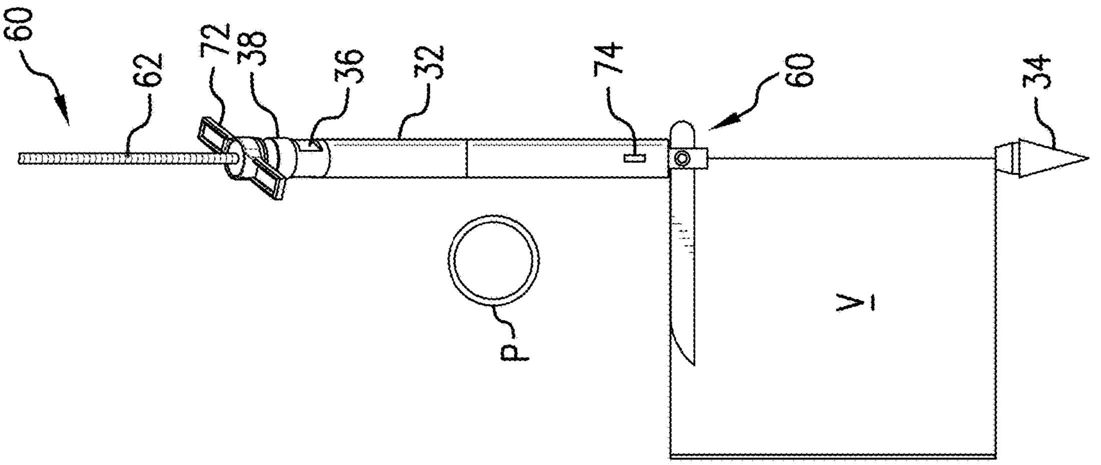
FIG. 8C is another side view illustrating the full extension of the lifting arm of the lifting member of the present invention.
Figure 8B:
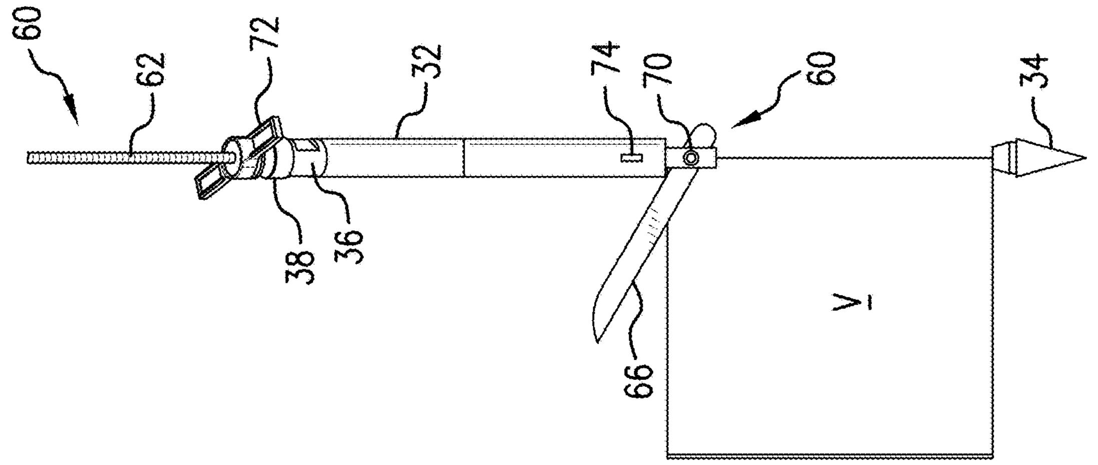
FIG. 8B is another side view illustrating the further extension of the lifting arm of the lifting member of the present invention.
Figure 8A:
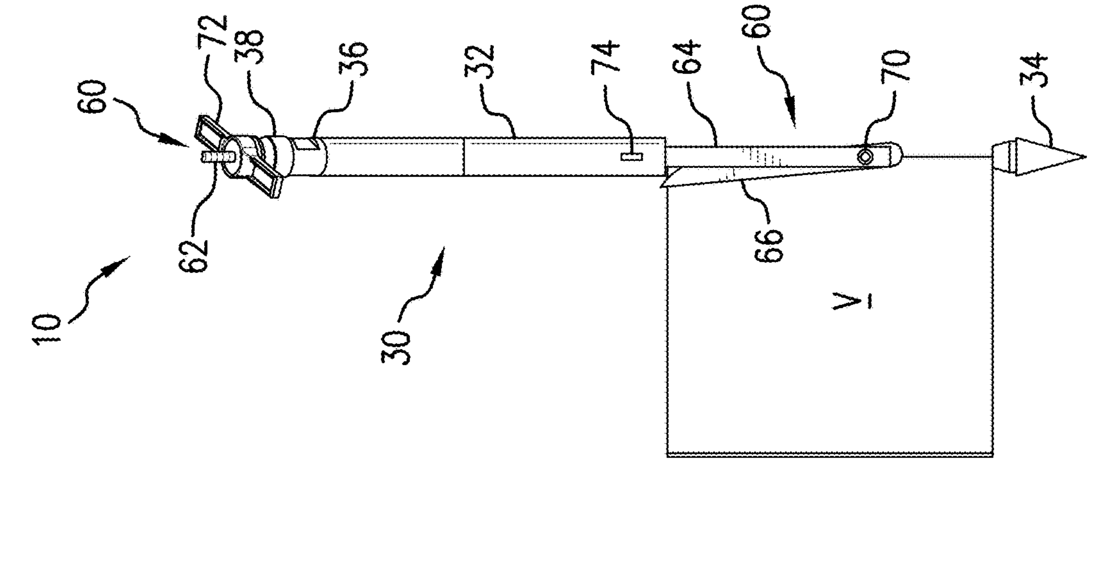
FIG. 8A is a side view illustrating the initial extension of the lifting arm of the lifting member of the present invention.

In FIG. 7, shaft 62 is shown extending from an upper portion of casement pipe 32 with a threaded handle 72 being threaded onto corresponding threads on shaft 62. Shaft 62 is pushed down so that arm mechanism 60 extends down below the lower end of casement pipe 32 and lifting arm 66 starts to extend as discussed above. Then shaft 32 is pulled up so that lifting arm 66 extends, as discussed herein and as illustrated in FIGS. 8A, 8B and 8C. Threaded handle 72 is used to pull shaft 62 upward until lifting arm 66 is secured against the bottom of casement pipe 32.

Now, additionally referring to FIGS. 8A, 8B and 8C, as lifting arm 66, 18 has moved outwardly as shown in FIG. 8A, and the curved portion is brought up against the lower end of casement pipe 32, the further upward movement shaft 62 causes lifting arm 66 to move away from its previously stowed position. Moving to FIG. 8B, it is observed that shaft 62 has been drawn upward further extending lifting arm 66. Shaft 62 is moved upward because of the rotation of handle 72 as it is threaded further along shaft 62. In FIG. 8C, lifting arm 66 is drawn against both sides of the lower end of casement pipe 32 to thereby secure lifting arm 66 perpendicular to casement pipe 32. As discussed later in one embodiment lifting arm 66 is secured at an angle other than perpendicular to casement pipe 32. A further feature is a spur 74 on at least one side of the bottom section of casement pipe 32, which leaves a small channel in ground G as casement pipe 32 is driven therein. This channel can be oriented to help allow lifting arm 66 to move a bit into the channel as it extends.

Figure 9:
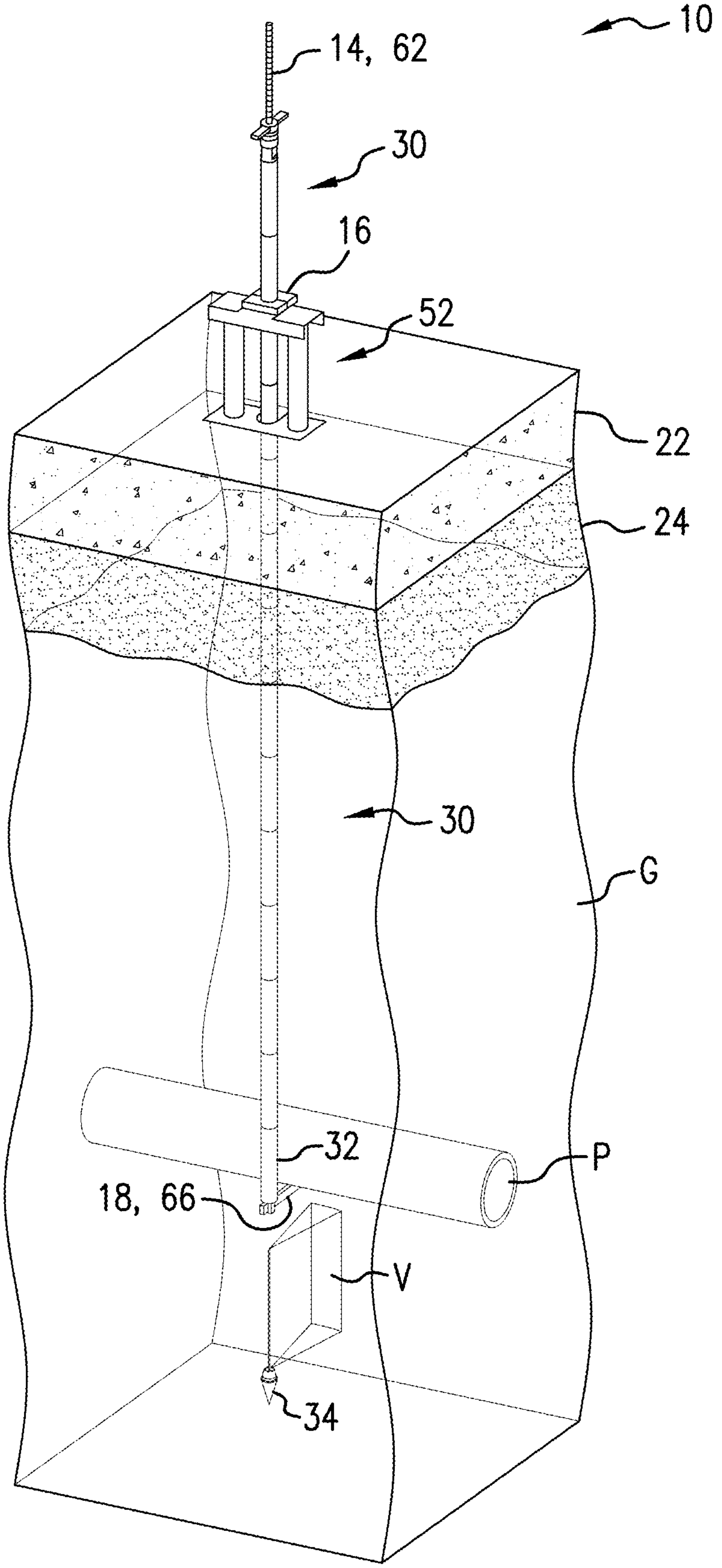
FIG. 9 is a perspective view illustrating the raising of the casement pipe until the lifting arm of the lifting member of the present invention is in contact with the underground pipe.

Now, additionally referring to FIG. 9 there is shown the lifting of pipe lifting system 30 by lifting mechanism 52 and once lifting arm 66 is in contact with pipe P lifting mechanism is used to reposition pipe P, or surface 22 is moved upward by the insertion of grout 24 to reposition both surface 22 and pipe P. To preserve clarity in this explanation, no steps have been shown where soil above pipe P may be removed, similar to that done to create void V, which allows for an easier lift of pipe P.

Figure 10A:
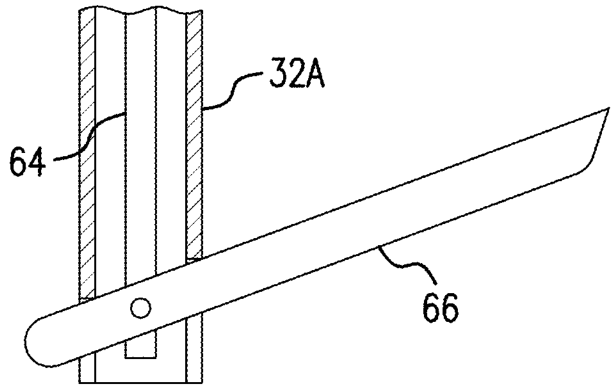
FIG. 10A is a side view illustrating two notches in the lower end of the casement pipe that have differing depths so that the lifting arm of the lifting member of the present invention is positioned at an upward angle.
Figure 10B:
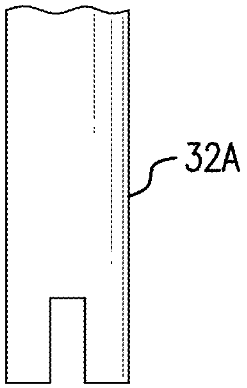
FIG. 10B is a side view illustrating one notch in the lower end of the casement pipe that has a first depth.
Figure 10C:
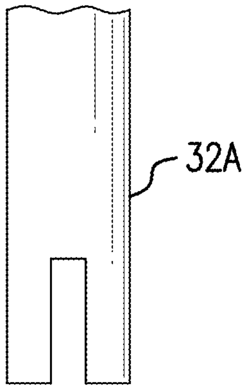
FIG. 10C is a side view illustrating one notch in the lower end of the casement pipe that has a second depth from that of FIG. 10B.
Figure 10D:
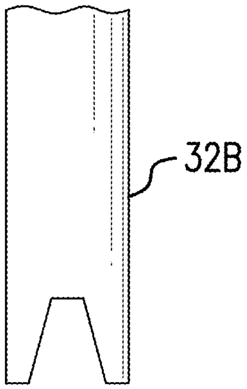
FIG. 10D is a side view illustrating a trapezoidal shaped notch in the lower end of the casement pipe.

Now, additionally referring to FIGS. 10A-D there is shown notches in pipe section 32A in FIG. 10A having two differing depths, which is further illustrated in FIGS. 10B and 10C, to angle lifting arm 66 as shown. FIG. 10D illustrates a trapezoidal notch in a pipe section 32B to center lifting arm 66. It is also contemplated to have just one notch to angle lifting arm 66

The figures discussed above, particularly starting with FIG. 2, in sequence illustrate the sequence of the method in use of system 10. Once casement pipe 32 is driven through the hole in surface member 22, or is driven directly into ground G then the inserting step is carried out, with the elements of the inserting step being accomplished by inserting lifting member 14 into casement pipe 32.

Prior to the inserting step, a step of hydro-excavating soil G proximate to a portion of underground pipe P can be carried out by using soil extraction device 40. The hydro-excavating step includes emitting water from at least one jet on hydro-excavating device 42 to thereby create an underground void V in soil G.

The positioning step includes a step of pivoting lifting arm 66. 18 from arm mechanism 60. Prior to the hydro-excavating step and the extension of lifting arm 66 accomplished in the pivoting step, the lifting of casement pipe 32 from expendable driving point 34 is completed to thereby allow device 42 and arm mechanism 60 to extend out of the lower end of casement pipe 32. As discussed above the drawing of lifting arm 66 up against casement pipe 32 after the lifting step allows the securing of lifting arm 66 in a position extending at an angle from casement pipe 32.

The clamping step includes the clamping of lifting member 14, 62 by clamping casement pipe 32 using clamp 16, 54 to secure casement pipe 32 to surface member 22 or to lifting mechanism 52. Lifting member 14, 62 thus secured to casement pipe 32 does thereby accomplish the clamping of the lifting member step.

Pipe relocating system 10 can also be termed an underground pipe in-situ relocation mechanism 10 that carries out the above described method.

Further a grout inserting device is insertable into casement pipe 32 to thereby deliver grout 24 to underground void V.

Once underground pipe P has been lifted and the use of lifting arm 66 is no longer needed lifting member moving device 72 is loosened releasing lifting arm 66 from its secure position against the lower end of casement pipe 32 and lifting arm 66 is configured to fall and be oriented in an opposite direction, which is opposite of the direction in which lifting arm 66 was inserted into casement pipe 32, this allowing an easy withdrawal of lifting member 14, 62 and lifting arm 66 as lifting arm 66 pivots to the opposite direction. Alternatively, if lifting arm 66 does not align with casement pipe 32 as desired, then casement pipe 32 can be raised a bit which will serve to force lifting arm 66 to align with casement pipe 32.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for the simultaneous lifting of an underground pipe and of a surface member, comprising the steps of:

cutting a hole through the surface member;

inserting at least one lifting member through the hole in the surface member and into the ground beneath the surface member, the lifting member being positioned alongside the underground pipe in the ground;

positioning a lifting arm coupled to the lifting member beneath a portion of the underground pipe;

raising the lifting member until the lifting arm contacts the underground pipe;

clamping the lifting member to secure the lifting member to the surface member; and causing the surface member to rise relative to the ground thereby causing the underground pipe to move in coordination with the surface member.

2. The method of claim 1, wherein the causing step includes the step of inserting material beneath the surface member and generally above the ground thereby moving the surface member relative to the ground, wherein the surface member is a concrete member.

3. The method of claim 2, wherein the underground pipe includes a P-Trap, one of the at least one lifting member being positioned proximate to the P-Trap.

4. The method of claim 1, further comprising a step of driving a casement pipe through the hole in the surface member and into the ground beneath the surface member prior to the inserting step, with the elements of the inserting step being accomplished by inserting the lifting member into the casement pipe.

5. The method of claim 4, further comprising a step of hydro-excavating soil proximate to a portion of the underground pipe prior to the inserting step.

6. The method of claim 5, wherein the hydro-excavating step includes emitting water from at least one jet on a hydro-excavating device to thereby create an underground void in the soil.

7. The method of claim 4, wherein the positioning step includes a step of pivoting the lifting arm from the lifting member.

8. The method of claim 7, further comprising the step of lifting the casement pipe from an expendable driving point prior to the pivoting step.

9. The method of claim 8, further comprising the step of drawing the lifting arm up against the casement pipe after the lifting step thereby securing the lifting arm in a position extending at an angle from the casement pipe.

10. The method of claim 9, wherein the clamping the lifting member step is accomplished by clamping the casement pipe to secure the casement pipe to the surface member, the lifting member being secured to the casement pipe to thereby accomplish the clamping of the lifting member step.

11. An underground pipe in-situ relocation mechanism, comprising a casement pipe insertable into the ground alongside of the underground pipe, the casement pipe having an upper end and a lower end;

a lifting member insertable into the casement pipe, the lifting member having a lifting arm pivotally coupled to an end of the lifting member; and a lifting member moving device positioned on the upper end of the casement pipe and coupled to an end of the lifting member opposite the lifting arm, the lifting member moving device being configured to move the lifting member relative to the casement pipe to secure the lifting arm against a bottom of the casement pipe after the lifting arm is extended beyond the lower end of the casement pipe and the lifting arm has pivoted from an aligned position in the casement pipe.

12. The underground pipe in-situ relocation mechanism of claim 11, wherein the mechanism is used to carry out the method of claim 1.

13. The underground pipe in-situ relocation mechanism of claim 11, wherein the lower end of the casement pipe has at least one notch into which the lifting arm will be drawn by way of the lifting member moving device.

14. The underground pipe in-situ relocation mechanism of claim 11, further comprising a vacuum adapter couplable to the upper end of the casement pipe, the vacuum adapter having a vacuum port.

15. The underground pipe in-situ relocation mechanism of claim 14, further comprising a pressure wand, the pressure wand being inserted through an opening in the vacuum adapter, the pressure wand extending through the casement pipe, the pressure wand suppling a pressurized fluid to soil proximate to the lower end of the casement pipe, loosed soil and fluid being drawn up the casement pipe exiting through the vacuum port.

16. The underground pipe in-situ relocation mechanism of claim 11, further comprising a grout inserting device insertable into the casement pipe to thereby deliver a grout to an underground void.

17. The underground pipe in-situ relocation mechanism of claim 11, further comprising a sacrificial point insertable into the lower end of the casement pipe, the casement pipe being sectioned into pieces that are couplable together, the pieces having indexing marks thereon.

18. The underground pipe in-situ relocation mechanism of claim 11, further comprising a lifting mechanism couplable to the upper end of the casement pipe, the lifting mechanism being configured to lift the casement pipe and the lifting member that is secured against the lower end of the casement pipe.

19. The underground pipe in-situ relocation mechanism of claim 11, further comprising a biasing device proximate to the lifting arm, the biasing device biasing the lifting arm outward, this outward bias causing the lifting arm to move beyond an inward perimeter of the lower end of the casement pipe when the lifting arm is moved below the lower end of the casement pipe.

20. The underground pipe in-situ relocation mechanism of claim 11, wherein once the use of the lifting arm is no longer needed the lifting member moving device is loosened, the casement pipe is lifted and the lifting arm is configured to orient in an opposite direction that is opposite of the lifting arm when the lifting arm was inserted into the casement pipe, this allowing an easy withdrawal of the lifting member and lifting arm once the lifting arm pivots to the opposite direction.

* * * * *